(12) United States Patent
Lancellotti et al.

(10) Patent No.: US 10,919,238 B2
(45) Date of Patent: Feb. 16, 2021

(54) METHOD OF CONTROLLING AN INDUCTIVE HEATING CIRCUIT TO SEAL A PACKAGING MATERIAL

(71) Applicant: Tetra Laval Holdings & Finance S.A., Pully (CH)

(72) Inventors: Mirco Lancellotti, San Cesario sul Panaro (IT); Rossano Guerri, Bibbiano (IT); Alessandro Boschi, Vignola (IT)

(73) Assignee: Tetra Laval Holdings & Finance S.A., Pully (CH)

( * ) Notice: Subject to any disclaimer, the term of this patent is extended or adjusted under 35 U.S.C. 154(b) by 46 days.

(21) Appl. No.: 16/480,845

(22) PCT Filed: Dec. 19, 2017

(86) PCT No.: PCT/EP2017/083470
§ 371 (c)(1),
(2) Date: Jul. 25, 2019

(87) PCT Pub. No.: WO2018/137857
PCT Pub. Date: Aug. 2, 2018

(65) Prior Publication Data
US 2020/0406562 A1  Dec. 31, 2020

(30) Foreign Application Priority Data

Jan. 25, 2017  (EP) .................................... 17153115

(51) Int. Cl.
*B29C 65/36* (2006.01)
*B29C 65/00* (2006.01)
(Continued)

(52) U.S. Cl.
CPC .... *B29C 66/91311* (2013.01); *B29C 65/3656* (2013.01); *B29C 65/3668* (2013.01);
(Continued)

(58) Field of Classification Search
CPC ........... B29C 66/91311; B29C 66/9592; B29C 66/961; B29C 66/91651; B29C 66/9512;
(Continued)

(56) References Cited

U.S. PATENT DOCUMENTS

| | | | | |
|---|---|---|---|---|
| 5,286,941 A | * | 2/1994 | Bel | H03L 5/02 219/121.36 |
| 2002/0047009 A1 | * | 4/2002 | Flugstad | H05B 6/50 219/771 |
| 2011/0225929 A1 | * | 9/2011 | Donati | B65B 51/227 53/377.7 |

FOREIGN PATENT DOCUMENTS

| | | |
|---|---|---|
| EP | 0495699 | 7/1992 |
| EP | 0950608 | 10/1999 |
| EP | 2026630 | 2/2009 |

OTHER PUBLICATIONS

Extended European Search Report issued in application No. 17153115.5 dated Jun. 21, 2017 (8 pages).
(Continued)

*Primary Examiner* — Daniel McNally
(74) *Attorney, Agent, or Firm* — Knobbe, Martens, Olson & Bear LLP (57) ABSTRACT

A method of controlling an inductive heating circuit, having a varying load, to seal a packaging material is provided. The method comprises generating AC power of at least two frequencies on at least one inductor in the inductive heating circuit; determining of the resulting phase shift in the inductive heating circuit from the current generated at the at least two frequencies; determining the impedance of the inductive heating circuit for each of the at least two frequencies; determining a load characteristics of the inductive heating circuit based on the relationship between the determined impedance and the determined phase shift; determining an impedance operating range; and selecting an AC
(Continued)

output frequency for an induction power generator based on the load characteristics which results in the least amount of phase shift from a set ideal value and which is associated with an impedance that is within the impedance operating range.

13 Claims, 7 Drawing Sheets (51) Int. Cl.
    *H05B 6/04*     (2006.01)
    *H05B 6/08*     (2006.01)
    *H05B 6/44*     (2006.01)
    *B65B 51/22*     (2006.01)
    *B29L 31/00*     (2006.01)
    *B29K 705/02*     (2006.01)

(52) U.S. Cl.
    CPC ...... *B29C 66/849* (2013.01); *B29C 66/91651* (2013.01); *B29C 66/9512* (2013.01); *B29C 66/9592* (2013.01); *B29C 66/961* (2013.01); *B65B 51/227* (2013.01); *H05B 6/04* (2013.01); *H05B 6/08* (2013.01); *H05B 6/44* (2013.01); *B29K 2705/02* (2013.01); *B29L 2031/712* (2013.01)

(58) Field of Classification Search
    CPC ... B29C 65/3668; B29C 65/3556; H05B 6/44; H05B 6/08; H05B 6/04; B65B 51/227; B29L 2031/712
    See application file for complete search history.

(56) References Cited

OTHER PUBLICATIONS

International Search Report and Written Opinion mailed in application No. PCT/EP2017/083470 dated Mar. 27, 2018 (12 pages).

* cited by examiner

METHOD OF CONTROLLING AN INDUCTIVE HEATING CIRCUIT TO SEAL A PACKAGING MATERIAL

FIELD OF THE INVENTION

The present invention generally relates to the field of induction heating. More particularly, the present invention relates to a method of controlling an inductive heating circuit, having a varying load, to seal a packaging material, and a control device for controlling the induction heating circuit.

BACKGROUND OF THE INVENTION

The welding of laminated packing material by means of induction heat is used in the packaging industry. One example of such a laminated material is a carrier layer of paper, aluminium foil and thermoplastic coatings along the inner and outer surfaces of the laminate. The technique of induction welding is based on the fact that the magnetic field around a conductor, generated by an alternating current is capable of inducing a current in an adjoining electrically conducting material, which depending on the resistance of the material, warms up the material. Thus, in induction welding an inductor loop or coil provided against the laminate containing the aluminium foil, and the laminate is pressed together with the material to which it is to be joined. The aluminium foil is heated by means of appropriately chosen current and processing period. The material is be heated to a temperature which is high enough to seal adjoining layers of thermoplastic, causing the combined thermoplastic layers to fuse together, thus producing a tight and durable seal. A modern method for manufacturing liquid packages includes providing a tube of the packaging material which is filled with contents in a filling machine, and sealed off along separate, narrow zones located at right angles to the longitudinal direction of the tube. It is customary in this context to use induction welding for the transverse sealing (TS) welds which divide the packing material tube into individual packages. To increase throughput, the sealing application has typically a plurality of inductors arranged in series in the application chain, allowing for simultaneous welding of a corresponding number of seals. Thus, the power generator pulse each of the inductors in the induction heating circuit. A problem arising in previous solutions is that the intermediate transformer matching network, between the power generator and the inductors, is not accurate enough to obtain high power efficiency when several different inductors are present in the application chain. Induction heating with the purpose of sealing packaging materials has the added difficulties that the transformation of the material from the initial state to a heated and welded or sealed state affects the load in the inductive heating circuit, since the packaging material is magnetically coupled to the inductor, via the electrically conducting component of the laminate. Adding the complexity of having a plurality of inductors, each presenting a unique characteristic and state in the application process, it is difficult to obtain a power delivery that is capable of following the dynamics of the inductive heating circuit. The lack of accuracy and efficiency, resulting in part from the variation of the load in the inductive heating circuit, will limit the throughput, which is detrimental in high-speed applications. Further, in order to limit these effects, the deficiencies of the induction heating circuit must be compensated, which will lead to a more complex design that could also limit the throughput or decrease the efficiency, in addition to increased costs. Another consequence relating to reduced efficiency of the power delivery in the induction heating circuit is reduced lifetime of the components.

Hence, an improved method of controlling an inductive heating circuit to seal packaging materials would be advantageous and in particular allowing for avoiding more of the above mentioned problems and compromises.

SUMMARY OF THE INVENTION

Accordingly, embodiments of the present invention preferably seek to mitigate, alleviate or eliminate one or more deficiencies, disadvantages or issues in the art, such as the above-identified, singly or in any combination by providing a device according to the appended patent claims.

According to a first aspect a method of controlling an inductive heating circuit, having a varying load, to seal a packaging material is provided. The inductive heating circuit has an induction power generator coupled the varying load. The method comprises generating AC power of at least two frequencies on at least one inductor in the inductive heating circuit; determining the resulting phase shift in the inductive heating circuit from the current generated at the at least two frequencies; determining the impedance of the inductive heating circuit for each of the at least two frequencies; determining a load characteristics of the inductive heating circuit based on the relationship between the determined impedance and the determined phase shift; determining an impedance operating range; and selecting an AC output frequency for the induction power generator based on the load characteristics which results in the least amount of phase shift from a set ideal value and which is associated with an impedance that is within the impedance operating range.

According to a second aspect a control device for controlling an induction heating circuit, having a varying load, to seal a packaging material is provided. The inductive heating circuit has an induction power generator coupled the varying load. The control device comprises a power control unit adapted to control the power generator to generate AC power of at least two frequencies on at least one inductor in the inductive heating circuit; a phase detection unit adapted to determine the resulting phase shift in the inductive heating circuit from the current generated at the at least two frequencies; and an impedance detection unit adapted to determine the impedance of the inductive heating circuit for each of the at least two frequencies. The control device comprises a processing unit adapted to determine a load characteristics of the inductive heating circuit based on the relationship between the determined impedance and the determined phase shift; determine an impedance operating range; and select an AC output frequency for the induction power generator based on the load characteristics which results in the least amount of phase shift from a set ideal value and which is associated with an impedance that is within the impedance operating range.

According to a third aspect a computer program product comprising instructions which, when the program is executed by a computer, cause the computer to carry out the steps of the method according to the first aspect is provided.

According to a fourth aspect the method according to the first aspect is used for sealing packaging material that comprises a portion of electrically conducting material along a sealing edge.

According to a fifth aspect the method according to the first aspect is used for determining material characteristics of a packaging material such as chemical or mechanical properties, based on the load characteristics of the packaging material.

Further embodiments of the invention are defined in the dependent claims, wherein features for the second and subsequent aspects of the invention are as for the first aspect mutatis mutandis.

Some examples of the disclosure provide for increased efficiency of the power delivery in an induction heating circuit.

Some examples of the disclosure provide for improved matching between a power generator and inductors in an induction heating circuit.

Some examples of the disclosure provide for increasing the lifetime of the components in an induction heating circuit.

Some examples of the disclosure provide for improved compensation of load variations in an induction heating circuit.

Some examples of the disclosure provide for reducing the complexity of an induction heating circuit having a plurality of inductors.

Some examples of the disclosure provide for reducing the number of transformers in an induction heating circuit having a plurality of inductors.

Some examples of the disclosure provide for better compensating for variations in the load as a packaging material is welded by induction heating.

Some examples of the disclosure provide for a more accurate power delivery in an induction heating circuit having a plurality of inductors.

Some examples of the disclosure provide for detecting defects in a packaging material.

Some examples of the disclosure provide for prediction of characteristics of the components in an induction heating circuit over time.

Some examples of the disclosure provide for predicting the maintenance in an induction heating circuit.

Some examples of the disclosure provide for lowering the costs of an inductive heating circuit for welding packaging materials.

Some examples of the disclosure provide for a more robust inductive heating circuit.

Some examples of the disclosure provide for increased throughout in a high-speed filling machine having a line of induction welding.

Some examples of the disclosure provide for completing the sealing of a packaging material in a reduced amount of time.

Some examples of the disclosure provide for improving the scalability of an inductive heating circuit in a filling machine with increased number of simultaneous welding applications.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

These and other aspects, features and advantages of which embodiments of the invention are capable of will be apparent and elucidated from the following description of embodiments of the present invention, reference being made to the accompanying drawings, in which.

DESCRIPTION OF EMBODIMENTS

Specific embodiments of the invention will now be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings, like numbers refer to like elements.

The following description focuses on examples applicable to inductive heating for sealing packaging containers. However, it will be appreciated that the examples are not limited to this application but may be applied to controlling inductive heating in many other applications.

Figure 1:
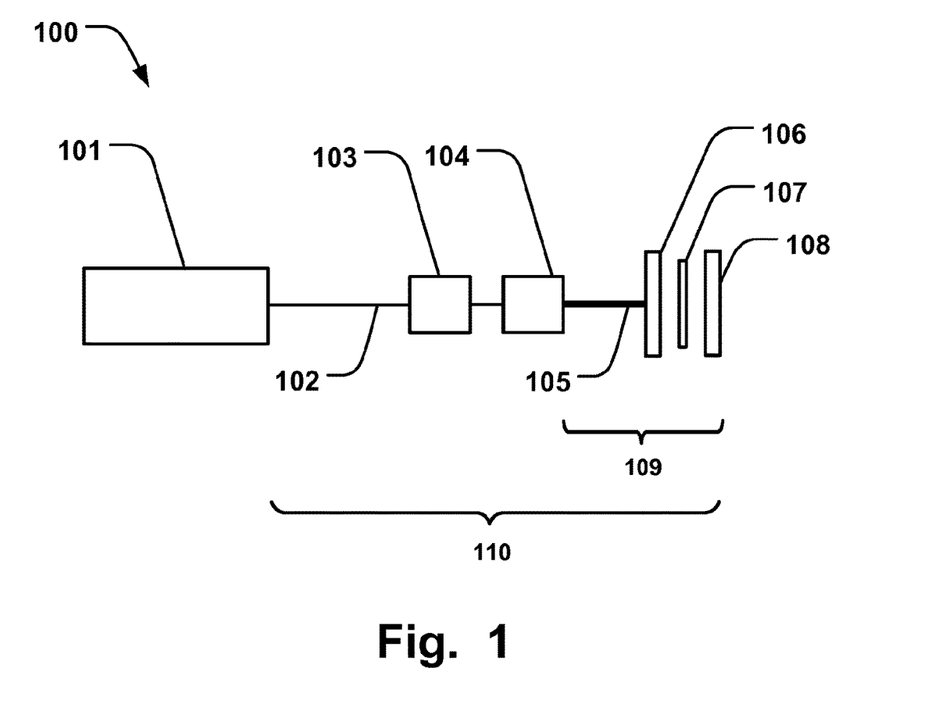
FIG. 1 is a schematic illustration of an inductive heating circuit for sealing a packaging material.
Figure 2:
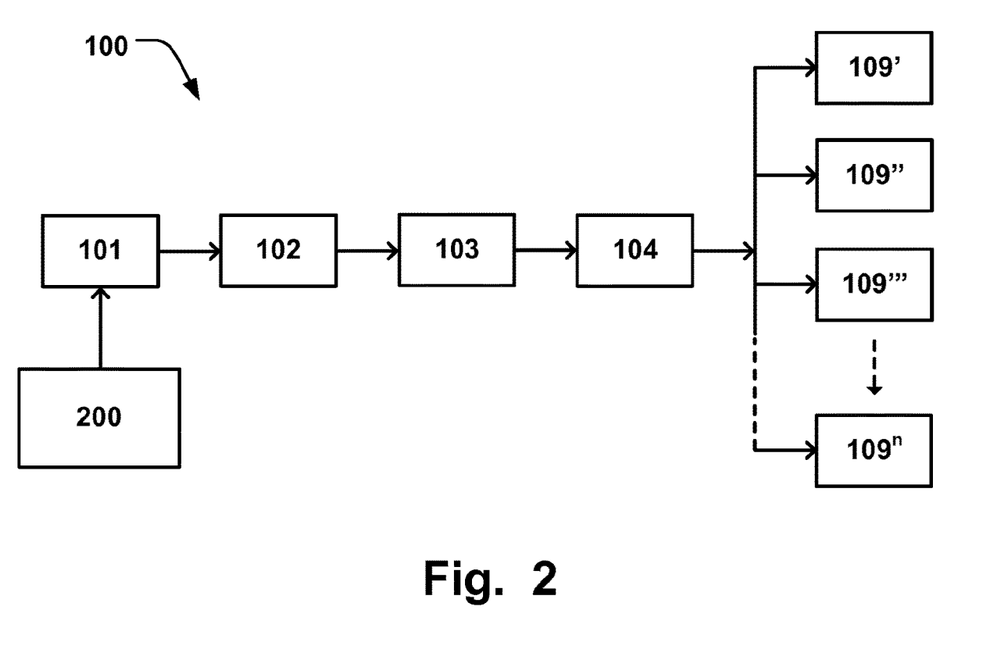
FIG. 2 is a schematic illustration an inductive heating circuit having a plurality of inductors for sealing a packaging material, and a control device for controlling the inductive heating circuit.

FIG. 1 shows an inductive heating circuit 100, in which an induction power generator 101 is connected via a coaxial cable 102 to a transformer or transformer matching network 103. The transformer 103 is connected to a brush rail system or an inductive power transfer unit 105, such as an IPT system, for contactless distribution of the electromagnetic energy to a busbar 105. The busbar 105 distributes the current to the inductor 106 over a relatively short distance and has a cross-section suitable for carrying the current needed in the induction heating process. The packaging material 107 is positioned between the inductor 106 and a movable jaw component 108, and is subsequently pressed between the inductor 106 and the movable jaw component 108. The packaging material 107, which comprises an at least partly electrically conducting material, such as an aluminum sheet in the laminate of the packaging material, is magnetically coupled to the inductor 106, whereby a current is induced in the aluminum sheet, thereby heating the same to complete the weld and sealing the packaging material 107. The coaxial cable 102 has typically a 50 Ohm resistance, but the components 110 to which the power generator 101 is coupled presents altogether a load that varies over time and the electrical characteristics of those components, including the coaxial cable 102. FIG. 2 illustrates the case where the inductive heating circuit 100 comprises a plurality of inductors 106 with accompanying busbars 105 and jaw components 108, being collectively referred to as inductor components 109', 109'', 109''', ..., 109''', in FIG. 2 for clarity of presentation. The power generator 101 thus sees the resistance or load of the components 110 to which it is connected, which includes the plurality of inductors 106, or inductor components 109', 109'', 109''', ..., 109'''. The plurality of inductor components 109', 109'', 109''', ..., 109''', are below referred to as the plurality of inductors 109 to facilitate the discussion.

Figure 7A:
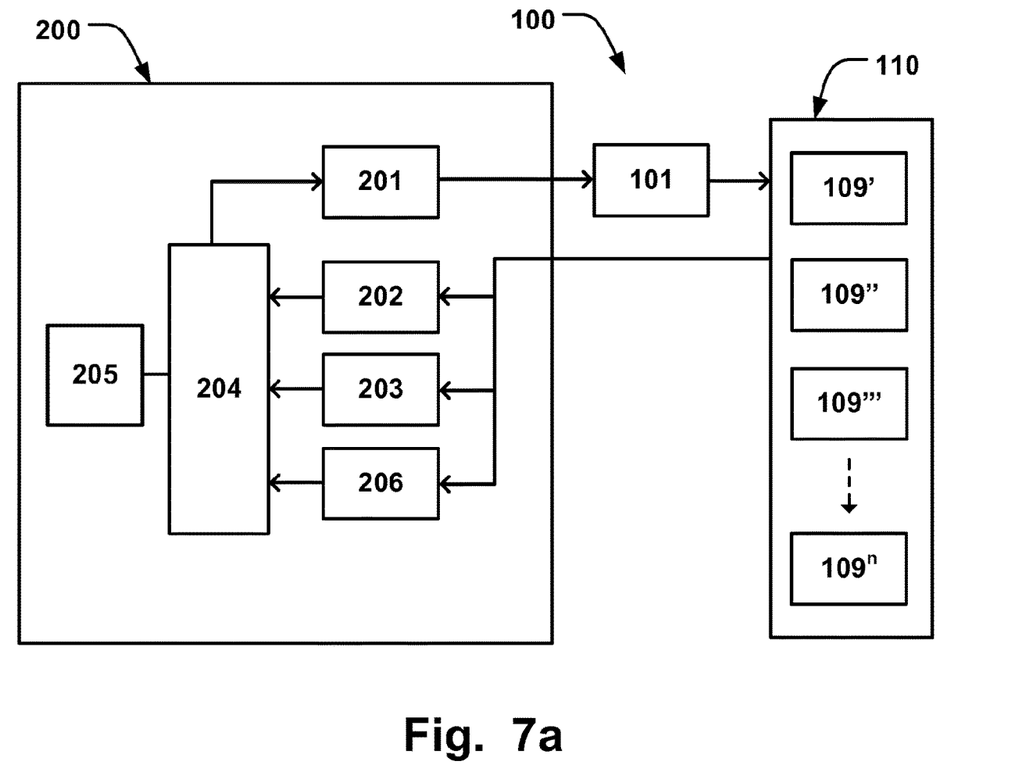
FIG. 7a is a schematic illustration of a control device for controlling an induction heating circuit to seal a packaging material.

FIG. 2 illustrates control device 200 for controlling the induction heating circuit 100, which has a varying load. As mentioned, the inductive heating circuit 100 has an induction power generator 101 coupled the varying load. The control device 200 is connected or connectable to the power generator 101. FIG. 7a illustrates a schematic of the control device 200. The control device 200 comprises a power control unit 201 adapted to control the power generator 101 to generate AC power of at least two frequencies on at least one inductor 106, 109, in the inductive heating circuit 100. The control device 200 comprises a phase detection unit 202 adapted to determine the resulting phase shift ($\phi$) in the inductive heating circuit 100 from the current generated at the at least two frequencies, and an impedance detection unit 203 adapted to determine the impedance (Z) of the inductive heating circuit 100 for each of the at least two frequencies. The phase shift ($\phi$) can be construed as the phase shift between the supplied voltage by the AC power generator and the current delivered to the inductive heating circuit 100. The control device 200 further comprises a processing unit 204 adapted to determine 404 (effectively representing method step 404 with reference to method 400) a load characteristics of the inductive heating circuit 100 based on the relationship between the determined impedance and the determined phase shift. The processing unit 204 is also adapted to determine 405 an impedance operating range and select 406 an AC output frequency for the induction power generator 101 based on the load characteristics which results in the least amount of phase shift from a set ideal value and which is associated with an impedance that is within the impedance operating range.

Selecting the output frequency as mentioned effectively corresponds to changing the electrical properties of the transformer matching network 103, and thereby allows for compensating any load variations in the inductive heating circuit 100. Thus, by determining the load characteristics of the inductive heating circuit 100, by characterizing the resulting phase shift and impedance in response to outputting AC power of at least two frequencies on at least one inductor 109, for example during a startup- or tuning process, or in real-time during online operation, the output frequency can be adjusted and optimized to achieve a minimum amount of deviation from an ideal power efficiency criteria. Such criteria can for example be a phase shift which is substantially zero or close to zero, and an impedance corresponding to the impedance of the coaxial cable 102, such as 50 Ohm, or within a determined acceptable impedance operating range. Increasing the efficiency can prolong the lifetime of the components in the inductive heating circuit 100, such as the generator 101. The power control provided by control device 200 allows for phase matching in the inductive heating circuit 100 while keeping the impedance of the circuit at optimal values. This is critical for inductive welding of packaging material 107 since loss of efficiency or power control may limit the throughput of the process or damage the laminate or seal itself. The load characteristics obtained serves as a model to serve as both long-term prediction of the electrical characteristics of the inductive heating circuit 100, or short-term or real-time regulation of fast-changing load variations during the sealing process. The short-term or real-time variation is also of particular relevance for sealing of packaging materials 107, since the materials of the laminate undergo dynamical chemical and/or mechanical changes during the sealing pulse.

Figure 3A:
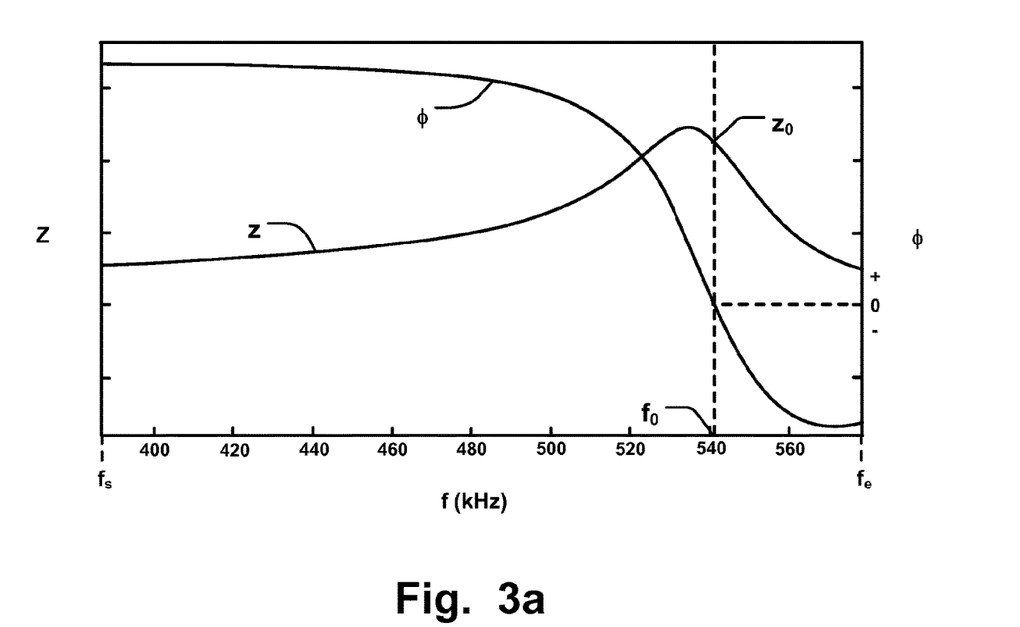
FIG. 3a is a schematic graph showing the relationship between the impedance, phase and frequency in an inductive heating circuit.
Figure 3B:
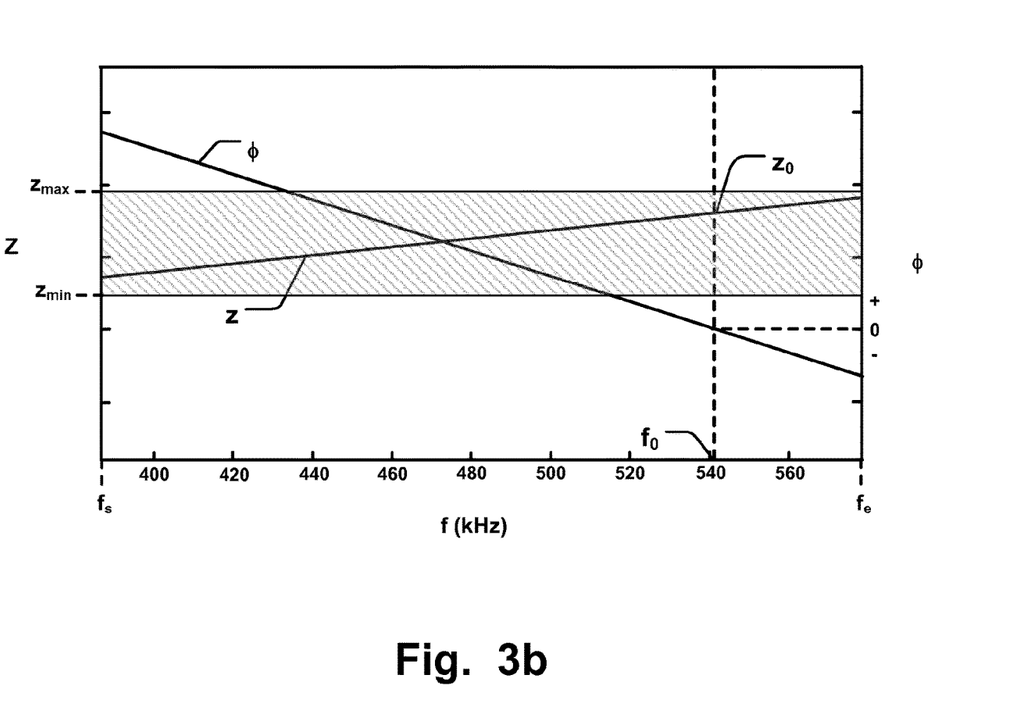
FIG. 3b is a schematic graph showing the relationship between the impedance, phase and frequency in an inductive heating circuit.
Figure 4A:
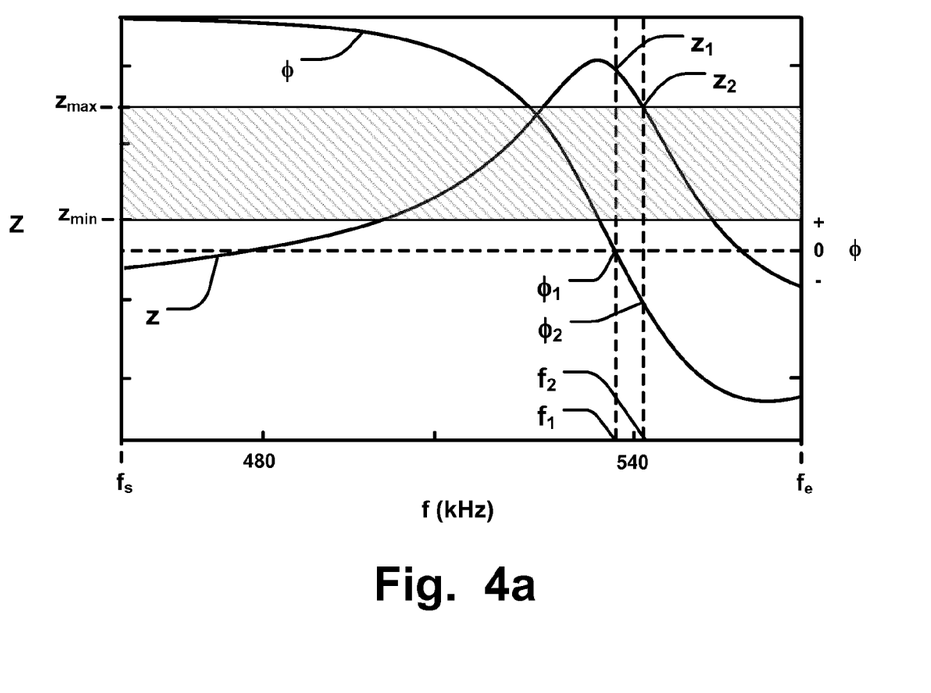
FIGS. 4a-c are further schematic graphs showing the relationship between the impedance, phase and frequency in an inductive heating circuit.

FIGS. 3a-b and 4a-c show examples of impedance (Z) and phase shift ($\phi$) for different frequencies (f) in the inductive heating circuit 100. FIG. 3a illustrates an example where a zero phase shift occurs at a frequency ($f_0$) close to 540 kHz, and the corresponding impedance ($z_0$). As mentioned above, the resulting phase shift ($\phi$) in the inductive heating circuit has been determined from the current generated at the at least two frequencies. FIG. 3b also illustrates an example where the resulting phase shift ($\phi$) has been determined for at least two frequencies. I.e. while it is possible to determine the resulting phase shift ($\phi$) in the inductive heating circuit with more than two frequencies, it is also sufficient to use only two frequencies, and fit a linear curve to the resulting impedance and phase shift as illustrated FIG. 3b. Hence, the linear load characteristics is utilized to select an input frequency that results in the minimum amount of deviation from an ideal phase shift at zero degrees while keeping the resulting impedance ($z_0$) in an operating range between $z_{min}$ and $z_{max}$. FIG. 4a illustrates also how the obtained load characteristics is utilized to select an input frequency that results in the minimum amount of deviation from an ideal phase shift at zero degrees while keeping the impedance in an operating range between $z_{min}$ and $z_{max}$. The first frequency ($f_1$) provides a phase shift ($\phi_1$) which is equal to zero. The associated impedance ($z_1$) is however outside the operating range between $z_{min}$ and $z_{max}$. Thus, the output frequency has to be increased, to $f_2$, to bring the impedance within the range at $z_2$, even though the phase $\phi_2$ is deviating more from the ideal set value.

Figure 4B:
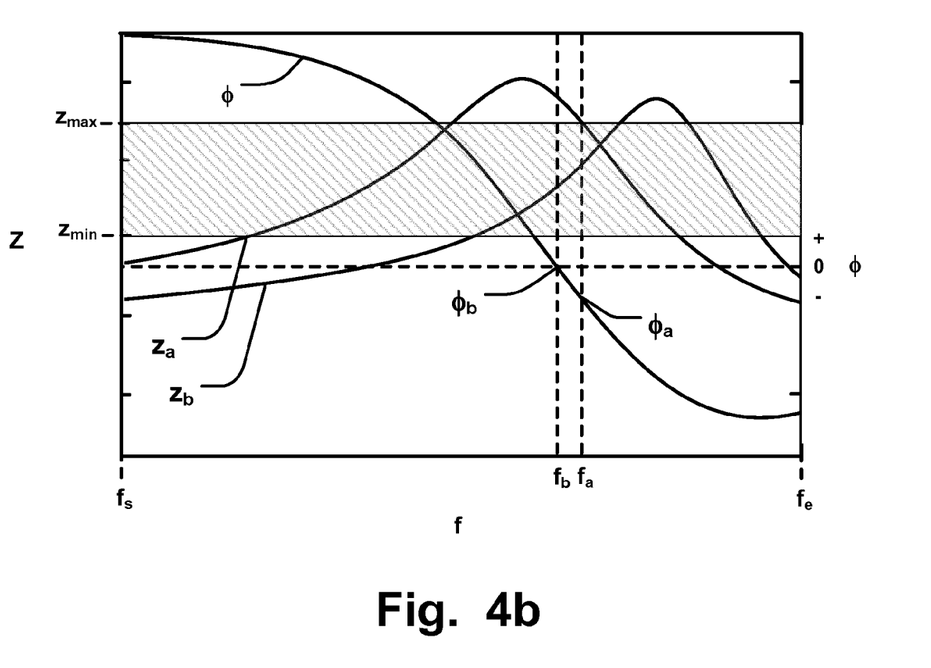

FIG. 4b illustrates another example, where two different impedance curves ($z_a$, $z_b$) represent two different load characteristics of the induction heating circuit 100. The phase shift is in this case the same for both loads. The first output frequency ($f_a$) is determined for the first impedance curve ($z_a$) in accordance with the method discussed in relation to FIG. 4a. I.e. in order to obtaining the minimum amount of phase shift deviation from the ideal value ($\phi$=0) while maintaining the impedance within the operating range ($z_{min}$, $z_{max}$). As the load changes, i.e. the curve $z_b$ being shifted to the right in FIG. 4b, a lower output frequency ($f_b$) can be selected to obtain a zero degree phase shift ($\phi_b$), which is associated with an impedance that is within the operating range ($z_{min}$, $z_{max}$) of the $z_b$-curve.

Figure 4C:
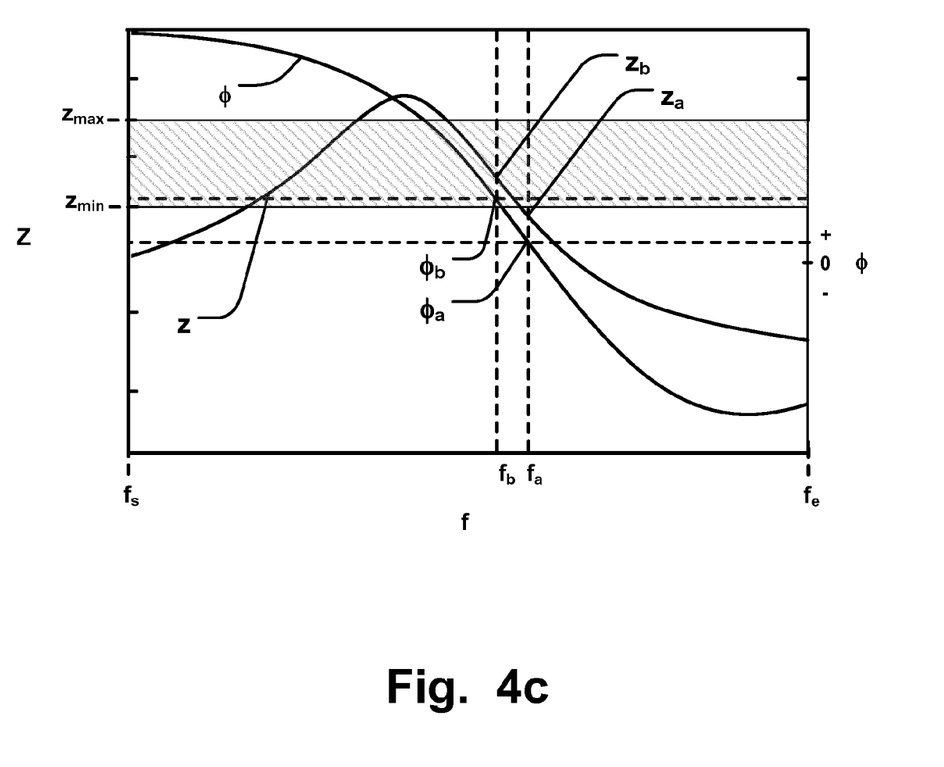

FIG. 4c illustrates an example where the load characteristics represented by the impedance (z) and phase shift ($\phi$) serves as a model to determine an adjustment of the output frequency which assumes a value $f_a$ at a first instance in time. This frequency ($f_a$) corresponds to a positive phase shift, which would require an increase in the output frequency in order to bring the phase shift closer to zero. The associated impedance ($z_a$) is however below the minimum value ($z_{min}$) of the operating range, so the frequency has to be decreased instead, to the frequency denoted $f_b$, to bring the impedance into the operating range at $z_b$ and the associated phase shift ($\phi_b$).

Figure 8:
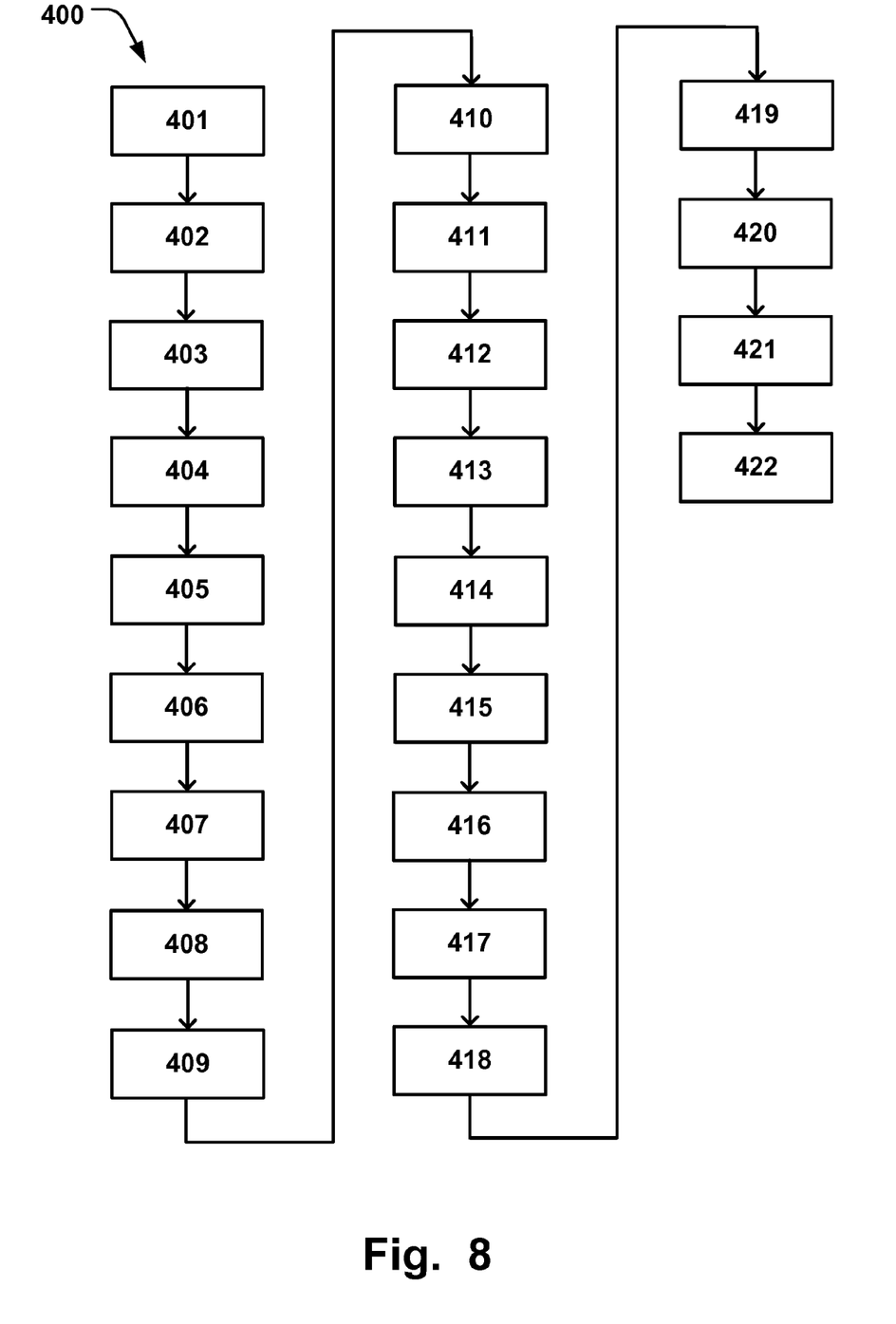
FIG. 8 is a flowchart of a method of controlling an inductive heating circuit to seal a packaging material.

A method 400 of controlling an inductive heating circuit 100, having a varying load, to seal a packaging material 107, is thus provided. The method 400 is schematically illustrated in FIG. 8. The order in which the steps of the method 400 are described and illustrated should not be construed as limiting and it is conceivable that the steps can be performed in varying order. The method 400 comprises generating 401 AC power of at least two frequencies on at least one inductor 106 in the inductive heating circuit, determining 402 the resulting phase shift ($\phi$) in the inductive heating circuit from the current generated at the at least two frequencies, determining 403 the impedance (z) of the inductive heating circuit for each of the at least two frequencies, and determining 404 a load characteristics of the inductive heating circuit based on the relationship between the determined impedance and the determined phase shift. The method 400 comprises determining 405 an impedance operating range ($z_{min}$, $z_{max}$), and selecting 406 an AC output frequency for the induction power generator based on the load characteristics which results in the least amount of phase shift from a set ideal value and which is associated with an impedance that is within the impedance operating range. The method 400 provides for the advantages as discussed above.

The method 400 may comprise determining 407 a power output set point at the at least one inductor 109 for the selected frequency and associated impedance. Thus, once the optimal output frequency has been determined for the current load seen by the generator 101, the desired power output can be set. The voltage of the power generator 101 is then varied 408 to output power at the at least one inductor 109 at the determined set point. The control device 200 may have further detection units 206, such as a voltage and current detection units for providing feedback to the control device to maintain the desired power output for the currently selected output frequency.

The method 400 may comprise determining 409 a phase deviation from the phase shift in the inductive heating circuit 100 associated with the selected output frequency while outputting power at the at least one inductor 109, and varying 410 the selected frequency to minimizing the phase deviation. The load characteristics may be used as a model to determine how much the output frequency should be varied to provide the necessary change in the phase shift to minimize the deviation. This may be done in real-time during pulsing of the inductors 109. In particular, if the load changes during a pulse, due to heating and melting of the various laminate components of the packaging material 107, the output frequency may be continuously adapted. A previously determined set of data of the load characteristics may be used as a model to approximate the necessary frequency correction, possibly in combination with historical averaging or predictive analysis including extrapolation of model data.

The step of varying the selected frequency to minimize the phase deviation may continue while the impedance in the inductive heating circuit 100 is maintained within the impedance operating range. However, as explained above in relation to e.g. FIG. 4c, the impedance control may take precedence over the phase shift control, whereby the method 400 may comprise determining 411 an impedance deviation from the impedance operating range in the inductive heating circuit, and the step of varying 412 the selected frequency to minimize the impedance deviation. Once the impedance is again contained within the desired operating range, the phase shift control may take precedence again.

Figure 5:
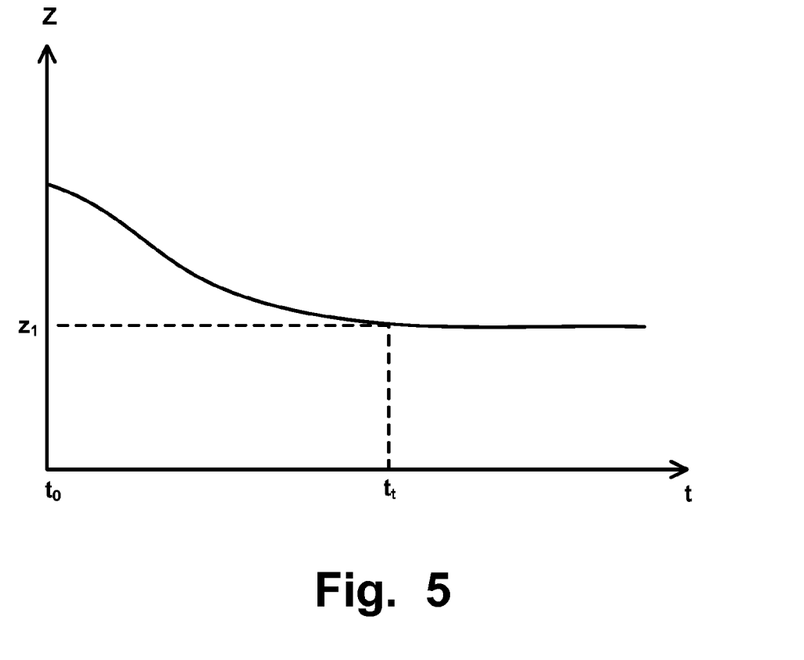
FIG. 5 is a schematic graph showing the impedance over time in an inductive heating circuit.

The method 400 may comprise delaying 413 the determination of the phase shift and the impedance with a predetermined off-set time ($t_t$) from a start time ($t_0$) when the power generation is initiated. This can be advantageous since the inductive heating may be associated with transient processes, that influence the initial characteristics. The transition between mechanical and chemical states of the packaging materials in the laminate upon applying heat can for example involve transient processes that affect the impedance and phase shift. FIG. 5 shows one example where the impedance reaches a steady-state after the transient time ($t_t$). Thus, having an off-set time may improve the accuracy of the induction heating control.

Generating AC power of at least two frequencies on at least one inductor 106, 109, in the inductive heating circuit 100 may comprise generating 414 a frequency sweep across a frequency range from a start frequency ($f_s$) to an end frequency ($f_e$). This is illustrated in FIGS. 3a and 4a-c. The method 400 comprises determining 415 a load characteristics range based on the resulting phase shift and impedance of the inductive heating circuit for the respective frequencies across the frequency range. Determining the load characteristics over a frequency range can improve the load model and facilitate the power control both in short-term or real-time control, or long-term predictive control such as determining trends for optimizing component life-time etc.

The inductive heating circuit 100 may comprise a plurality of inductors 109', 109'', 109''', . . . , 109$^n$, as illustrated in FIG. 7a. For each of the plurality of inductors the method 400 may comprise generating 414 a frequency sweep, determining 415 the load characteristics, and selecting 406 an output frequency for the associated inductor 109. As elucidated above, the method 400 provides for an advantageous control for a plurality of inductors 109 as the output frequency can be customized to each individual inductor 109 depending on the load presented by the inductor 109 (and the associated components of the particular inductor 109, such as the busbar 105, jaw component 108, and packaging material 107), which provides for phase matching and impedance control without having to use a dedicated transformer 103 for each of the inductors 109, which would render a highly complex, slow and less robust power control. The method 400 and control device 200 facilitates scalability of the induction heating system of a filling machine, due employing the discussed control logic instead of using hardware adaptations to match the different and varying loads. The power control unit 200 may thus be adapted to generate a frequency sweep across a frequency range from a start frequency ($f_s$) to an end frequency ($f_e$) at each of the inductors 106, 109. The processing unit 204 may be adapted to determine a load characteristics range for each of the inductors based on the resulting phase shift and impedance at each of the inductors for the respective frequencies across the frequency range.

Figure 7B:
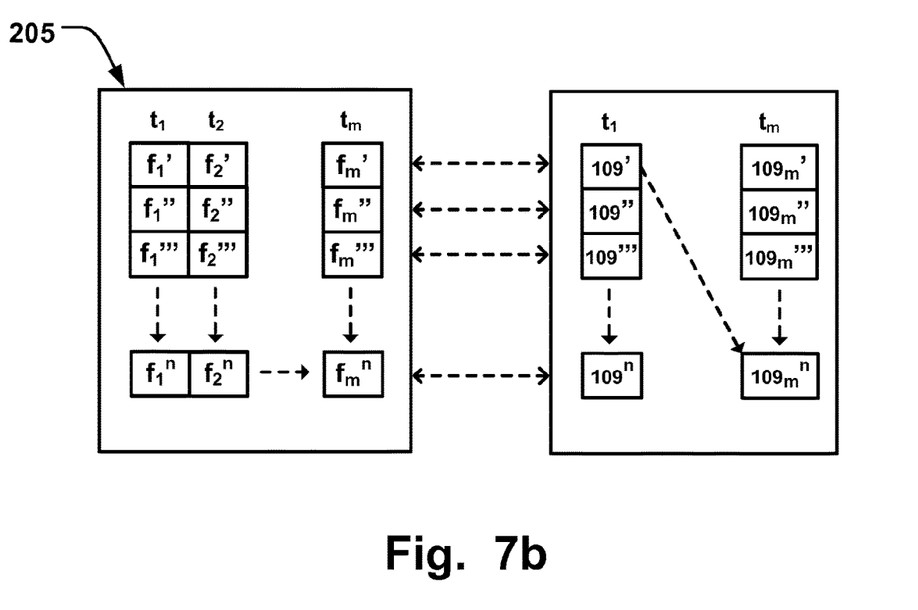
FIG. 7b is a schematic illustration of a detail of a control device for controlling an induction heating circuit to seal a packaging material.

For a subsequent pulse of AC power delivered to a corresponding inductor of the plurality of inductors 109, the method 400 may comprise reading 416 a previously stored output frequency value associated with the corresponding inductor as input to select 416 an output frequency for the subsequent pulse of AC power. This allows for providing a more accurate working- or starting point for the particular inductor 109 when repeatedly pulsed. Such iterative process may improve on the accuracy of the selected output frequency. FIG. 7b schematically illustrate a memory structure 205 of the control device 200, which may store output frequency values for the corresponding inductors 109', 109'', 109''', . . . , 109$^n$, over time $t_1, t_2, \ldots, t_m$. Starting at $t_1$, which is the first cycle of pulses at frequencies $f_1', f_1'', f_1''', \ldots, f_1^n$, for the corresponding inductors 109', 109'', 109''', . . . , 109$^n$, the subsequent second cycle at $t_2$, may start by reading the previously stored output frequency $f_1'$ for inductor 109', and determine an adapted frequency $f_2'$ as output at $t_2$. Impedance and phase shift data representing the load characteristics for the particular inductor 109 may be used as a model to improve on the previously stored frequency value. The accuracy and efficiency of the power control may thus be further improved over time.

Generating a frequency sweep for each of the plurality of inductors 109 may comprise generating 417 a pulse of AC power with a frequency that vary from the start frequency to the end frequency for the duration of the pulse at each of the plurality of inductors 109. Thus, during a single pulse, the frequency may be adjusted to obtain the load characteristics. This may have the benefit that the characteristics can be determined throughout the sealing pulse, i.e. following the load variation as the packaging material is sealed. At the same time, this process can introduce more variables in the retrieved data due to the variation of the material properties during the sealing. Alternatively, the method comprise generating 418 pulses of AC power, each having a fixed frequency across the range from the start frequency to the end frequency, at each of the plurality of inductors 109. Thus, the frequency is kept constant each time the particular inductor is pulsed. The impedance and phase shift may be determined after a transient time ($t_r$), e.g. after 50 ms, for each pulse.

Figure 6:
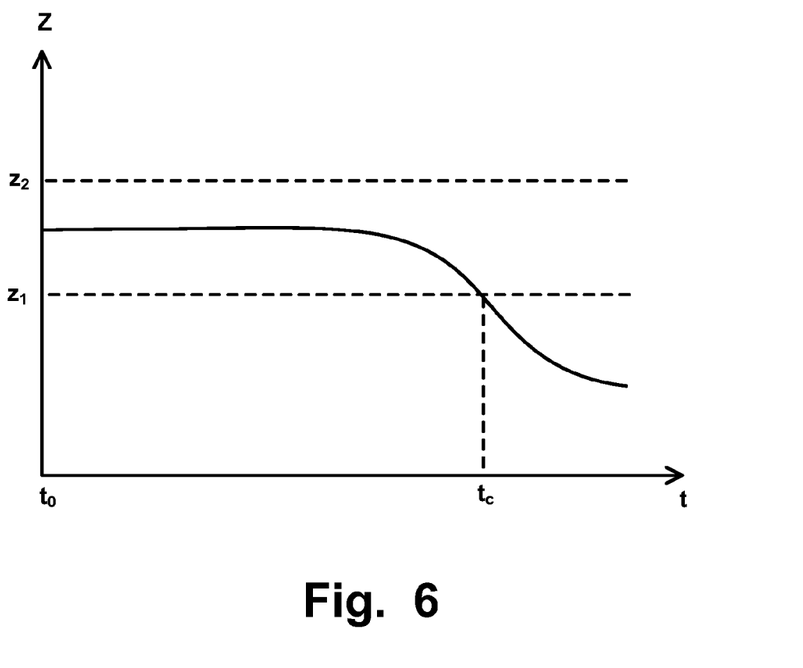
FIG. 6 is a further schematic graph showing the impedance over time in an inductive heating circuit.

As discussed, the at least one inductor may be magnetically coupled to an electrically conductive material 107 contributing to the load of the inductive heating circuit 100. The method 400 may comprise determining 419 the impedance of the inductive heating circuit 100, including the at least one inductor and the electrically conductive material 107, in response to at least two consecutive AC power pulses, whereby each associated impedance is determined after a transient time period ($t_r$) from the start of the corresponding pulse. The transient time period ($t_r$) may correspond to the period of time for the electrically conductive material to reach a defined heated state in response to the inductive heating. This provides for determining the contribution to the load from the packaging material 107, since the first pulse will give the contribution from the inductor and the packaging material, and the second pulse will give the contribution from the inductor 106, 109 only, as the material has reached a steady state after the first pulse. The method may thus comprise determining 420 the contribution to the load from the electrically conductive material 107, and further, defining 421 a range of load values of said contribution to set a load threshold for the electrically conductive material. The method 400 may further comprise detecting 422 a deviation from the load threshold to notify of a change in material properties of the electrically conductive material. The change may be a result of defects in the packaging material 107, and it is thus possible to detect such defects. FIG. 6 illustrates detecting of a deviation at time $t_c$, upon which the impedance pass the lower load threshold ($z_1$). An upper load threshold is denoted $z_2$ in the figure. The robustness of the induction heating circuit 100 may thus be improved by such diagnostic abilities. Detected deviations may be a result of defects in the material or that the material is in the wrong position.

The load characteristics of the packaging material, being determined as explained above, may also be used for determining material characteristics of the packaging material, such as chemical or mechanical properties, e.g. composition or thickness of the materials in the laminate.

Further with respect to the detection of deviations as described above; a baseline level of the electrical characteristics may first be determined, to accurately define the characteristic thresholds for the deviations. Once the baseline has been logged and archived, the parameters may be read during filling machine operation, and the logged data may be analysed in real time. In case of deviations from the data baseline an alarm may be triggered. The changes to the sealing parameters during packages production can be; i) with a slow deviation from the baseline on a medium/long period of time; and (ii) with a sudden immediate change. In the first case the analysis on the data may be used for a predictive maintenance while in the second case the analysis may be used for triggering an immediate alarm for a potential package integrity issue In the first case, some examples of issues that could result to a filling machine issue are; slow deterioration of the inductor; slow deviation of transformer characteristics; slow deterioration of the RF cables; or slow deviations of jaw links in the inductor chain. In the second case, issues that could affect the package integrity during filling machine utilisation can be the packaging material may be bended or broken in front of the inductor, or a broken Inductor. Two potential sudden changes to the load while in production can be changes due to normal machine production events (e.g.: packaging material splice, machine restart, inductor movement, or issues on the packaging material or load.

A computer program product comprising instructions which, when the program is executed by a computer, cause the computer to carry out the steps of the method 400 described above is also provided according to the present disclosure.

Use of the method 200 as described above for sealing packaging material 107 that comprises a portion of electrically conducting material along a sealing edge is also provided according to the present disclosure.

The present invention has been described above with reference to specific embodiments. However, other embodiments than the above described are equally possible within the scope of the invention. The different features and steps of the invention may be combined in other combinations than those described. The scope of the invention is only limited by the appended patent claims. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used.

The invention claimed is:

1. A method of controlling an inductive heating circuit, having a varying load, to seal a packaging material, the inductive heating circuit having an induction power generator coupled to the varying load, the method comprising:
   generating AC power of at least two frequencies on at least one inductor in the inductive heating circuit,
   determining the resulting phase shift ($\phi$) in the inductive heating circuit from the current generated at the at least two frequencies,
   determining the impedance (z) of the inductive heating circuit for each of the at least two frequencies,
   determining a load characteristics of the inductive heating circuit based on the relationship between the determined impedance and the determined phase shift,
   determining an impedance operating range ($z_{min}$, $z_{max}$), and selecting an AC output frequency for the induction power generator based on the load characteristics which results in the least amount of phase shift from a set ideal value and which is associated with an impedance that is within the impedance operating range.

2. Method according to claim 1, comprising:
determining a power output set point at the at least one inductor for the selected frequency and associated impedance, and
varying the voltage of the power generator to output power at the at least one inductor at the determined set point.

3. Method according to claim 2, comprising:
determining a phase deviation from the phase shift in the inductive heating circuit associated with the selected frequency while outputting power at the at least one inductor, and
varying the selected frequency to minimize the phase deviation.

4. Method according to claim 3, wherein varying the selected frequency to minimize the phase deviation continues while the impedance in the inductive heating circuit is maintained within the impedance operating range, the method further comprising:
determining an impedance deviation from the impedance operating range in the inductive heating circuit, and
varying the selected frequency to minimize the impedance deviation.

5. Method according to claim 1, wherein generating AC power of at least two frequencies on at least one inductor in the inductive heating circuit comprises:
generating a frequency sweep across a frequency range from a start frequency ($f_s$) to an end frequency ($f_e$), and
determining a load characteristics range based on the resulting phase shift and impedance of the inductive heating circuit for the respective frequencies across the frequency range.

6. Method according to claim 5, wherein the inductive heating circuit comprises a plurality of inductors, whereby for each of the plurality of inductors the method comprising:
generating a frequency sweep,
determining the load characteristics,
selecting an output frequency, and
for a subsequent pulse of AC power delivered to a corresponding inductor of the plurality of inductors, reading a previously stored output frequency value associated with the corresponding inductor as input to select an output frequency for the subsequent pulse of AC power.

7. Method according to claim 6, wherein generating a frequency sweep for each of the plurality of inductors comprises:
generating a pulse of AC power with a frequency that vary from the start frequency to the end frequency for the duration of the pulse at each of the plurality of inductors, or
generating pulses of AC power, each having a fixed frequency across the range from the start frequency to the end frequency, at each of the plurality of inductors.

8. Method according to claim 1, wherein the at least one inductor is magnetically coupled to an electrically conductive material contributing to the load of the inductive heating circuit, the method comprising:

determining the impedance of the inductive heating circuit, including the at least one inductor and the electrically conductive material, in response to at least two consecutive AC power pulses, whereby each associated impedance is determined after a transient time period ($t_t$) from the start of the corresponding pulse, wherein the transient time period corresponds to the period of time for the electrically conductive material to reach a defined heated state in response to the inductive heating.

9. Method according to claim 8, comprising:
determining the contribution to the load from the electrically conductive material,
defining a range of load values of said contribution to set a load threshold for the electrically conductive material, and
detecting a deviation from the load threshold to notify of a change in material properties of the electrically conductive material.

10. Method according to claim 1, comprising:
delaying the determination of the phase shift and the impedance with a predetermined off-set time ($t_t$) from a start time ($t_0$) when the power generation is initiated.

11. A computer program product comprising instructions which, when the program is executed by a computer, cause the computer to carry out the steps of the method according to claim 1.

12. A control device for controlling an inductive heating circuit, having a varying load, to seal a packaging material, the inductive heating circuit having an induction power generator coupled to the varying load, the control device comprises:
a power control unit adapted to control the power generator to generate AC power of at least two frequencies on at least one inductor in the inductive heating circuit,
a phase detection unit adapted to determine the resulting phase shift in the inductive heating circuit from the current generated at the at least two frequencies,
an impedance detection unit adapted to determine the impedance of the inductive heating circuit for each of the at least two frequencies, and
a processing unit adapted to:
determine a load characteristics of the inductive heating circuit based on the relationship between the determined impedance and the determined phase shift,
determine an impedance operating range, and
select an AC output frequency for the induction power generator based on the load characteristics which results in the least amount of phase shift from a set ideal value and which is associated with an impedance that is within the impedance operating range.

13. Control device according to claim 12, wherein:
the inductive heating circuit comprises a plurality of inductors,
the power control unit is adapted to generate a frequency sweep across a frequency range from a start frequency ($f_s$) to an end frequency ($f_e$) at each of the inductors, and
the processing unit is adapted to determine a load characteristics range for each of the inductors based on the resulting phase shift and impedance at each of the inductors for the respective frequencies across the frequency range.

* * * * *

UNITED STATES PATENT AND TRADEMARK OFFICE
CERTIFICATE OF CORRECTION

PATENT NO. : 10,919,238 B2
APPLICATION NO. : 16/480845
DATED : February 16, 2021
INVENTOR(S) : Mirco Lancellotti et al.

Page 1 of 1

It is certified that error appears in the above-identified patent and that said Letters Patent is hereby corrected as shown below:

On the Title Page

In Column 2, Item (57), Line 5, under Abstract, delete "of the" and insert --the--.

In the Specification

In Column 8, Line 66, delete "$f_1$''," and insert --$f_1$'''--,--.

In the Claims

In Column 10, Line 63, Claim 1, delete "a load" and insert --load--.

In Column 12, Line 42 (Approx.), Claim 12, delete "a load" and insert --load--.

Signed and Sealed this
Thirteenth Day of April, 2021

Drew Hirshfeld
*Performing the Functions and Duties of the
Under Secretary of Commerce for Intellectual Property and
Director of the United States Patent and Trademark Office*